(12) United States Patent
Savidge (10) Patent No.: US 11,603,684 B2
(45) Date of Patent: Mar. 14, 2023

(54) AIRCRAFT DOOR HANDLE ASSEMBLY

(71) Applicant: BOMBARDIER INC., Dorval (CA)

(72) Inventor: John Richard Savidge, Sooke (CA)

(73) Assignee: BOMBARDIER INC., Dorval (CA)

( * ) Notice: Subject to any disclaimer, the term of this patent is extended or adjusted under 35 U.S.C. 154(b) by 374 days.

(21) Appl. No.: 16/720,618

(22) Filed: Dec. 19, 2019

(65) Prior Publication Data

US 2020/0199920 A1    Jun. 25, 2020

Related U.S. Application Data

(60) Provisional application No. 62/781,988, filed on Dec. 19, 2018.

(51) Int. Cl.
  *E05B 85/02*  (2014.01)
  *E05B 85/10*  (2014.01)
  *E05B 1/00*  (2006.01)

(52) U.S. Cl.
  CPC .......... *E05B 85/107* (2013.01); *E05B 85/103* (2013.01); *E05B 1/003* (2013.01); *E05Y 2900/502* (2013.01)

(58) Field of Classification Search
  CPC ........ E05B 5/003; E05B 85/10; E05B 85/103; E05B 85/107; E05B 17/0025; E05B 1/0092; E05B 1/003; E05B 5/00; E05B 5/006; E05B 7/00; E05B 13/005; Y10S 292/31; Y10S 292/71; Y10T 292/089; Y10T 292/57
  See application file for complete search history.

(56) References Cited

U.S. PATENT DOCUMENTS

| | | | | |
|---|---|---|---|---|
| 967,377 | A * | 8/1910 | Henry | ....................... E05C 1/06 292/142 |
| 2,210,080 | A * | 8/1940 | Hover | ................. E05B 65/0864 292/180 |
| 2,234,651 | A * | 3/1941 | Pick | .......................... E05B 5/00 292/126 |
| 2,243,772 | A * | 5/1941 | Peltier | ................. E05B 65/0046 292/11 |

(Continued)

FOREIGN PATENT DOCUMENTS

| | | |
|---|---|---|
| CN | 105270601 A | 4/2017 |
| CN | 111058690 A * | 4/2020 |

(Continued)

*Primary Examiner* — Carlos Lugo
(74) *Attorney, Agent, or Firm* — Norton Rose Fulbright Canada LLP (57) ABSTRACT

A handle assembly for an aircraft door includes a shaft to open the door, an exterior handle deployable between a stowed position and a deployed position, and a clutch having a driving member coupled to the exterior handle and a driven member coupled to the shaft. The clutch is configurable between a disengaged configuration in which the driving member and the driven member are disengaged, and an engaged configuration in which the driving member and the driven member are engaged so that actuation of the exterior handle rotates the shaft to open the door. Rotation of the exterior handle between the stowed position and the deployed position drives an axial movement of the driving member toward the driven member to configure the clutch to the engaged configuration.

19 Claims, 10 Drawing Sheets

(56) References Cited

U.S. PATENT DOCUMENTS

| | | | | |
|---|---|---|---|---|
| 3,111,833 A | * | 11/1963 | Dettmer | E05B 5/003 |
| | | | | 292/242 |
| 4,487,440 A | | 12/1984 | Beijer | |
| 4,510,779 A | * | 4/1985 | Ahad | E05B 5/00 |
| | | | | 292/DIG. 31 |
| 4,556,244 A | * | 12/1985 | Bisbing | E05B 17/0025 |
| | | | | 292/336.3 |
| 4,878,367 A | * | 11/1989 | Bisbing | E05B 35/008 |
| | | | | 70/491 |
| 4,907,716 A | * | 3/1990 | Wankel | E05B 35/008 |
| | | | | 220/326 |
| 5,156,359 A | | 10/1992 | Noble et al. | |
| 5,234,238 A | * | 8/1993 | Takimoto | E05B 5/00 |
| | | | | 292/216 |
| 5,319,992 A | * | 6/1994 | Shui-Te | G05G 5/06 |
| | | | | 16/438 |
| 5,368,347 A | * | 11/1994 | Holtman | E05B 65/006 |
| | | | | 292/1 |
| 5,409,272 A | * | 4/1995 | McCormack | E05B 5/00 |
| | | | | 292/229 |
| 6,044,673 A | * | 4/2000 | Jefferson | G05G 5/00 |
| | | | | 292/257 |
| 6,357,268 B1 | * | 3/2002 | Takimoto | E05B 17/0025 |
| | | | | 70/208 |
| 6,659,513 B1 | * | 12/2003 | Ramsauer | E05B 17/0025 |
| | | | | 292/64 |
| 6,953,209 B2 | * | 10/2005 | Jackson, Jr. | E05B 17/0025 |
| | | | | 16/412 |
| 7,320,236 B2 | * | 1/2008 | Monneret | E05B 35/008 |
| | | | | 70/169 |
| 7,360,802 B2 | * | 4/2008 | Schlack | E05B 1/0092 |
| | | | | 292/75 |
| 7,441,427 B2 | * | 10/2008 | Vickers | E05B 17/0025 |
| | | | | 70/127 |
| 7,958,603 B2 | * | 6/2011 | Franco | E05B 1/0092 |
| | | | | 16/412 |
| 8,137,039 B2 | * | 3/2012 | Liang | E05D 5/08 |
| | | | | 411/34 |
| 9,170,598 B2 | * | 10/2015 | Goetze | G05G 1/04 |
| 9,657,497 B2 | * | 5/2017 | Adams, IV | E05C 3/02 |
| 10,087,664 B2 | * | 10/2018 | Auriac | E05C 5/04 |
| 2014/0331722 A1 | * | 11/2014 | Bridgewater | E05C 5/02 |
| | | | | 70/57 |

FOREIGN PATENT DOCUMENTS

| | | | | | |
|---|---|---|---|---|---|
| DE | 19957697 A1 | * | 6/2001 | | E05B 13/005 |
| FR | 836432 A | * | 1/1939 | | E05B 5/00 |
| FR | 3024994 A1 | * | 2/2016 | | E05B 7/00 |
| GB | 2551592 A | * | 12/2017 | | E05B 13/005 |
| JP | 2001207696 A | * | 8/2001 | | |
| KR | 2001002262 A | * | 1/2001 | | |

* cited by examiner

AIRCRAFT DOOR HANDLE ASSEMBLY

CROSS-REFERENCE TO RELATED APPLICATION AND CLAIM OF PRIORITY

The present application claims priority from U.S. Provisional Patent Application No. 62/781,988 filed on Dec. 19, 2018, the entire contents of which are incorporated by reference herein.

FIELD

This relates generally to mobile platforms such as aircraft, and in particular, to handle assemblies for aircraft doors.

BACKGROUND

Some aircraft may have doors, such as passenger doors, that can be opened from both the interior and the exterior of the aircraft. For example, an interior handle may function to open and close the passenger door from the interior of the aircraft, and an exterior handle may function to open and close the passenger door from the exterior of the aircraft.

Traditionally, such an interior handle and exterior handle may be connected and may rotate together to open or close the passenger door. However, in such a configuration it may be difficult to actuate or rotate one of the handles, to open the passenger door, in the event that the other handle is obstructed, for example, in the case of an exterior handle obstructed by ice. Improvement is desired.

SUMMARY

According to an aspect, there is provided a handle assembly for an aircraft door, the aircraft door including an exterior side and an interior side, the handle assembly comprising: a shaft rotatable about a shaft axis to facilitate opening of the aircraft door; an exterior handle accessible from the exterior side of the aircraft door and deployable between a stowed position, in which the exterior handle is recessed within an opening on the exterior side of the aircraft door, and a deployed position; and a clutch having a driving member drivingly coupled to the exterior handle and a driven member drivingly coupled to the shaft, the clutch configurable between a disengaged configuration in which the driving member and the driven member are disengaged and the exterior handle is drivingly uncoupled from the shaft, and an engaged configuration in which the driving member and the driven member are engaged and the exterior handle is drivingly coupled to the shaft via the driving member and the driven member so that actuation of the exterior handle causes a rotation of the shaft to facilitate opening of the door, wherein rotation of the exterior handle between the stowed position and the deployed position drives an axial movement of the driving member along the shaft axis toward the driven member to configure the clutch to the engaged configuration.

In some embodiments, the exterior handle is rotatable to deploy from the stowed position to the deployed position.

In some embodiments, the actuation of the exterior handle comprises rotation of the exterior handle about the shaft axis.

In some embodiments, the clutch is biased toward the disengaged configuration.

In some embodiments, the handle assembly may further comprise a coil spring coaxial with the shaft axis to bias the clutch toward the disengaged configuration.

In some embodiments, the shaft extends axially through the coil spring.

In some embodiments, the driving member is disposed within a housing that is movable along the shaft axis.

In some embodiments, the exterior handle is drivingly coupled to the driving member by way of the housing.

In some embodiments, in the engaged configuration, the housing rotates about the shaft axis as the exterior handle rotates about the shaft axis.

In some embodiments, the driving member comprises a plurality of first teeth configured to engage with a plurality of second teeth of the driven member in the engaged configuration of the clutch.

In some embodiments, the driving member comprises a first surface configured to frictionally engage with a second surface of the driven member in the engaged configuration of the clutch.

In some embodiments, the exterior handle is rotatable about a connection axis that is generally orthogonal to the shaft axis.

In some embodiments, the exterior handle comprises two oppositely extending portions having their adjacent ends pivoted on a common pivot rotatable about the connection axis and the exterior handle is rotatably connected to the driving member.

In some embodiments, the common pivot is restrained from axial movement along the shaft axis.

In some embodiments, the handle assembly further comprises an interior handle drivingly coupled to the shaft and accessible from the interior side of the aircraft door.

According to another aspect, there is provided an aircraft door comprising the handle assembly as described herein.

According to another aspect, there is provided an aircraft comprising the aircraft door as described herein.

According to another aspect, there is provided a method for operating an aircraft door, the aircraft door having an interior side, an exterior side, an exterior handle accessible from the exterior side, and a shaft rotatable about a shaft axis to facilitate opening of the aircraft door, the method comprising: when the exterior handle deploys between a stowed position, in which the exterior handle is recessed within an opening on the exterior side of the aircraft door, and a deployed position, driving axial movement of a driving member of a clutch that is drivingly coupled to the exterior handle along the shaft axis toward a driven member of the clutch that is drivingly coupled to the shaft, wherein the axial movement of the driving member configures the clutch from a disengaged configuration in which the driving member and the driven member are disengaged and the exterior handle is drivingly uncoupled from the shaft, to an engaged configuration in which the driving member and the driven member are engaged and the exterior handle is drivingly coupled to the shaft via the driving member and the driven member so that actuation of the exterior handle causes a rotation of the shaft to facilitate opening of the aircraft door.

In some embodiments, when the exterior handle deploys, the exterior handle rotates from the stowed position to the deployed position.

In some embodiments, the exterior handle rotates from the stowed position to the deployed position about a connection axis that is generally orthogonal to the shaft axis.

In some embodiments, the exterior handle comprises two oppositely extending portions having their adjacent ends pivoted on a common pivot and when the exterior handle deploys, each portion rotates from the stowed position to the deployed position about the connection axis.

In some embodiments, the actuation of the exterior handle comprises rotation of the exterior handle about the shaft axis.

Other features will become apparent from the drawings in conjunction with the following description.

BRIEF DESCRIPTION OF DRAWINGS

In the figures which illustrate example embodiments.

DETAILED DESCRIPTION

A passenger door may be present in an aircraft to permit passengers to board and exit the aircraft. In various embodiments, the handle assembly for a passenger door and associated methods described herein may facilitate opening of the passenger door from the interior of the aircraft via an interior handle without having to also actuate an exterior door handle of the passenger door.

In an example, a passenger door may have both an exterior handle and an interior handle. The interior handle may allow the passenger door to be opened and closed from an interior side of the door. The exterior handle may allow the passenger door to be opened and closed from an exterior side.

Traditional doors with an interior handle and exterior handle drivingly connected by a common shaft may be difficult to use, for example, in icing conditions. Ice on the exterior of an aircraft may obstruct use of the door and prevent an exterior handle from rotating. Thus an interior handle may be correspondingly obstructed, and prevent the shaft from rotating to open the door. Existing passenger doors may disengage the exterior handle from the interior handle using complex clutches that may require adjustment and occupy a significant amount of space. As such, in passenger aircraft doors, it may be desirable to have the interior door handle be disconnectable from the interior door handle using a simplified clutch.

In the embodiments disclosed herein, the exterior handle and interior handle may be engaged by way of a clutch, for example, a one-way clutch mechanism. The one-way clutch mechanism may provide for the interior handle to be permanently connected to the main drive mechanism, or shaft, to open or close the passenger door, and the exterior handle may be connectable to the shaft by way of the clutch. As such, in operation, as the interior handle rotates to drive a shaft to open the passenger door, the exterior handle is disengaged from the shaft and does not rotate. Therefore, if the exterior handle is obstructed, it may still be possible to open the door by way of the interior handle. As the exterior handle is deployed and rotates away from the door, the exterior handle engages with the shaft to rotate the shaft to open or close the door. The interior handle may also rotate correspondingly when the exterior handle is rotated.

Although the disclosure herein primarily makes reference to a passenger door in an aircraft, it will be understood that aspects of the present disclosure can equally apply to other doors of an aircraft.

Similarly, even though the disclosure mainly makes reference to an aircraft door as an example, aspects of the present disclosure can equally apply to doors of other types of mobile platforms such as trains, buses, watercraft (e.g., ships), spacecraft, trucks and other vehicles. Aspects of various embodiments are described through reference to the drawings.

Figure 1:
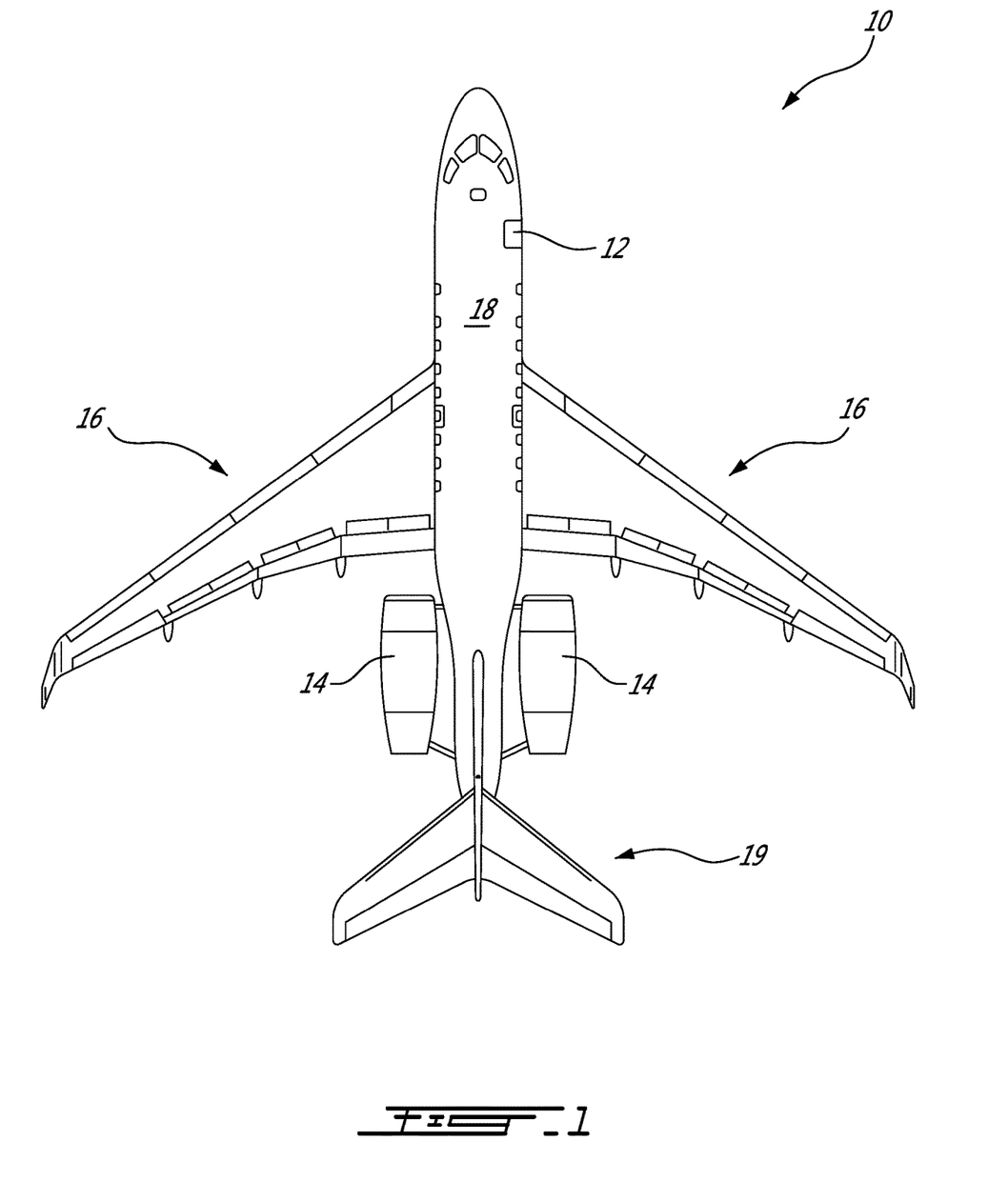
FIG. 1 is a top view of an aircraft having a passenger door, in accordance with an embodiment.

FIG. 1 is a top plan view of an exemplary aircraft 10 which can comprise a passenger door 12, as described herein. Aircraft 10 can be a fixed-wing aircraft comprising one or more engines 14. Aircraft 10 can comprise wings 16, fuselage 18 and empennage 19. Aircraft 10 can be any type of aircraft such as corporate, private, commercial and passenger aircraft suitable for civil aviation. For example, aircraft 10 can be a (e.g., ultra-long range) business jet, a twin-engine turboprop airliner or a regional jet airliner.

Door 12 separates and forms a barrier between the interior of the aircraft 10 and its exterior environment. Accordingly, door 12 can be configured to withstand a pressure differential between the interior and exterior of aircraft 10 due to pressurization of the interior (e.g., passenger cabin and cockpit) of aircraft 10 during flight. Door 12 therefore defines an exterior side 11 on a first side of door 12, and an interior side 13 on a second side of door 12, as shown, for example, in FIG. 4.

Figure 2:
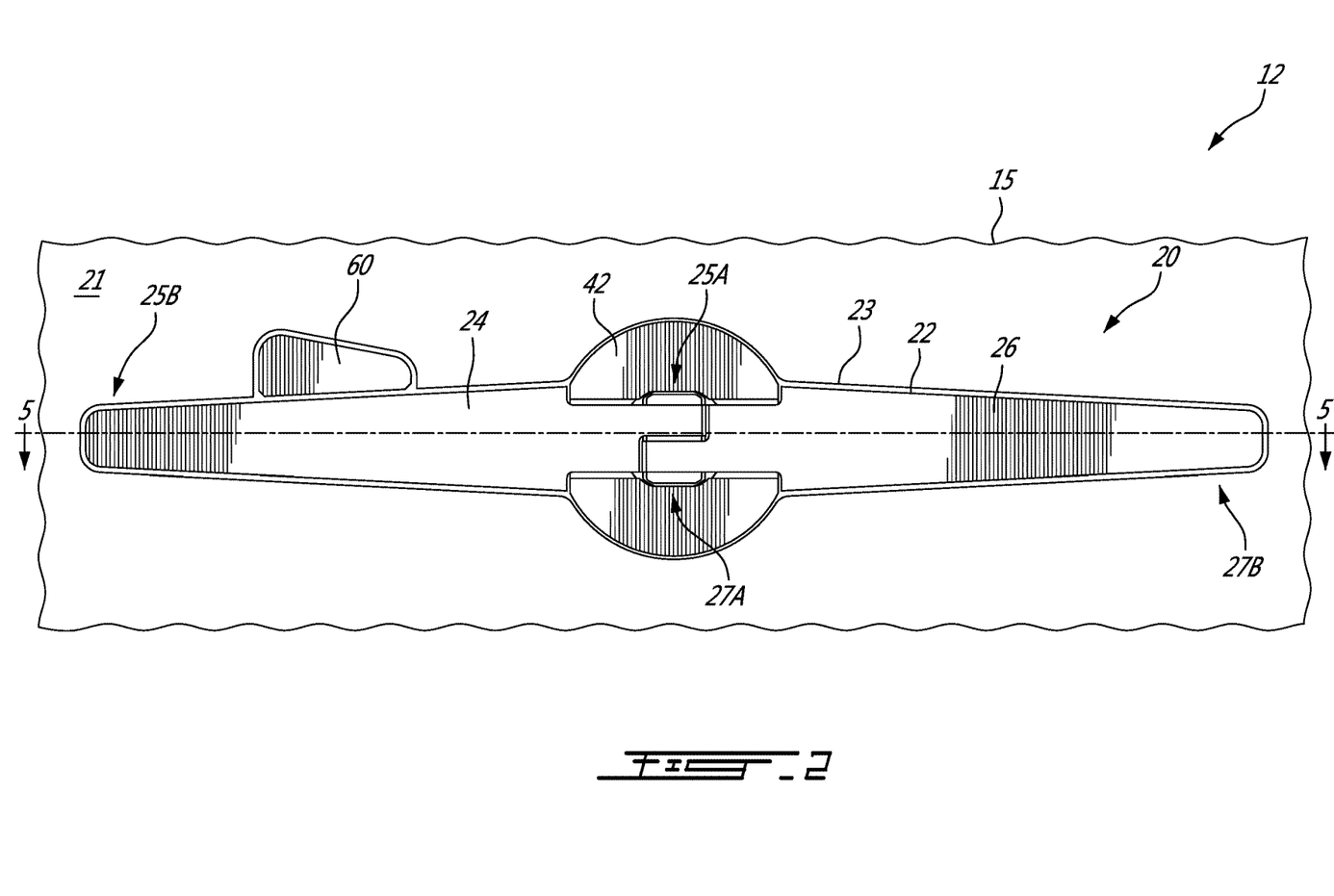
FIG. 2 is a front view of a handle assembly having a butterfly handle for a passenger door, in accordance with an embodiment.
Figure 3:
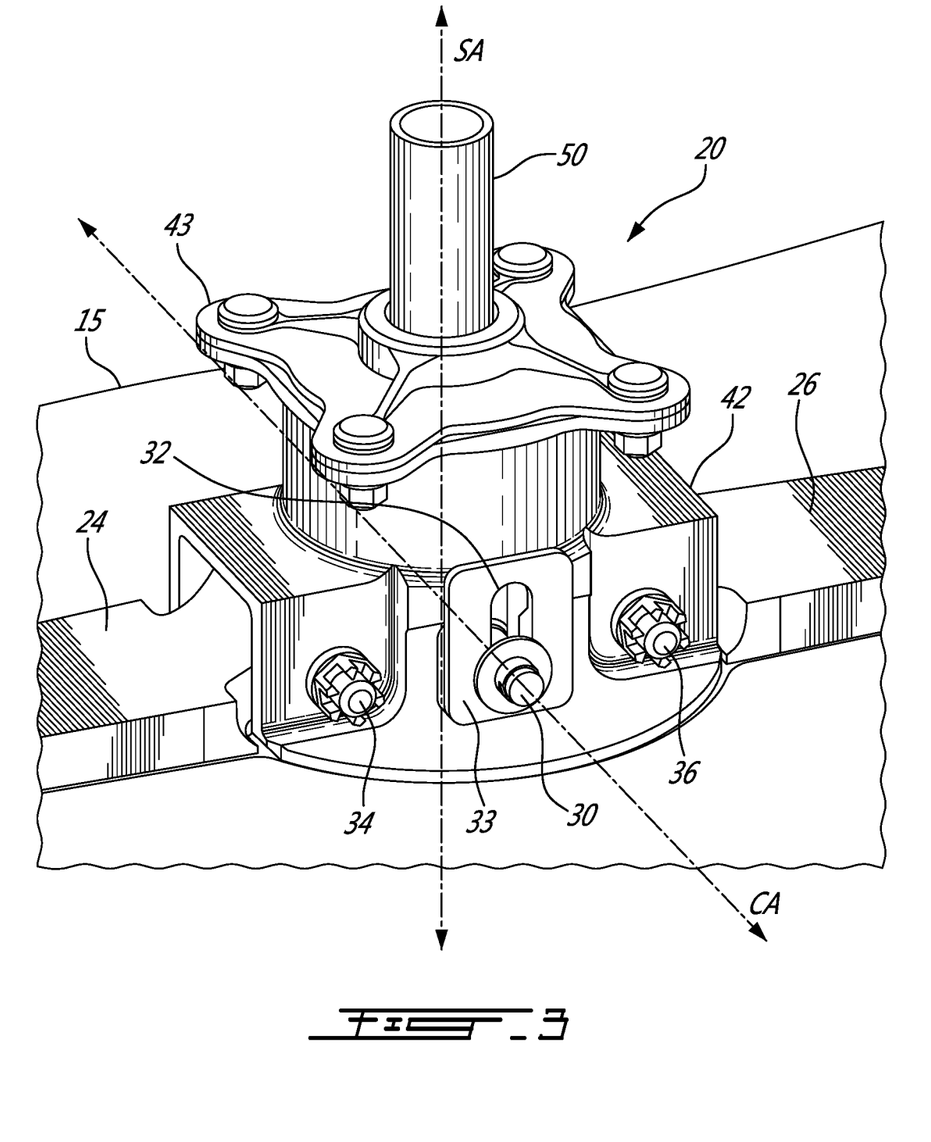
FIG. 3 is a rear perspective view of the handle assembly of FIG. 2.

FIG. 2 is a front view of a handle assembly 20 in a passenger door 12, in accordance with an embodiment. FIG. 3 is a rear perspective view of handle assembly 20.

Door 12 has a door body 15 with an exterior surface 21 adjacent to exterior side 11. Door body 15 defines a recess 23 on exterior surface 21 open to exterior side 11. Recess 23 may be sized to receive an exterior handle accessible from exterior side 11, such as a butterfly handle 22 of handle assembly 20. Door body 15 further defines an opening through which clutch 40 is disposed.

Figure 4:
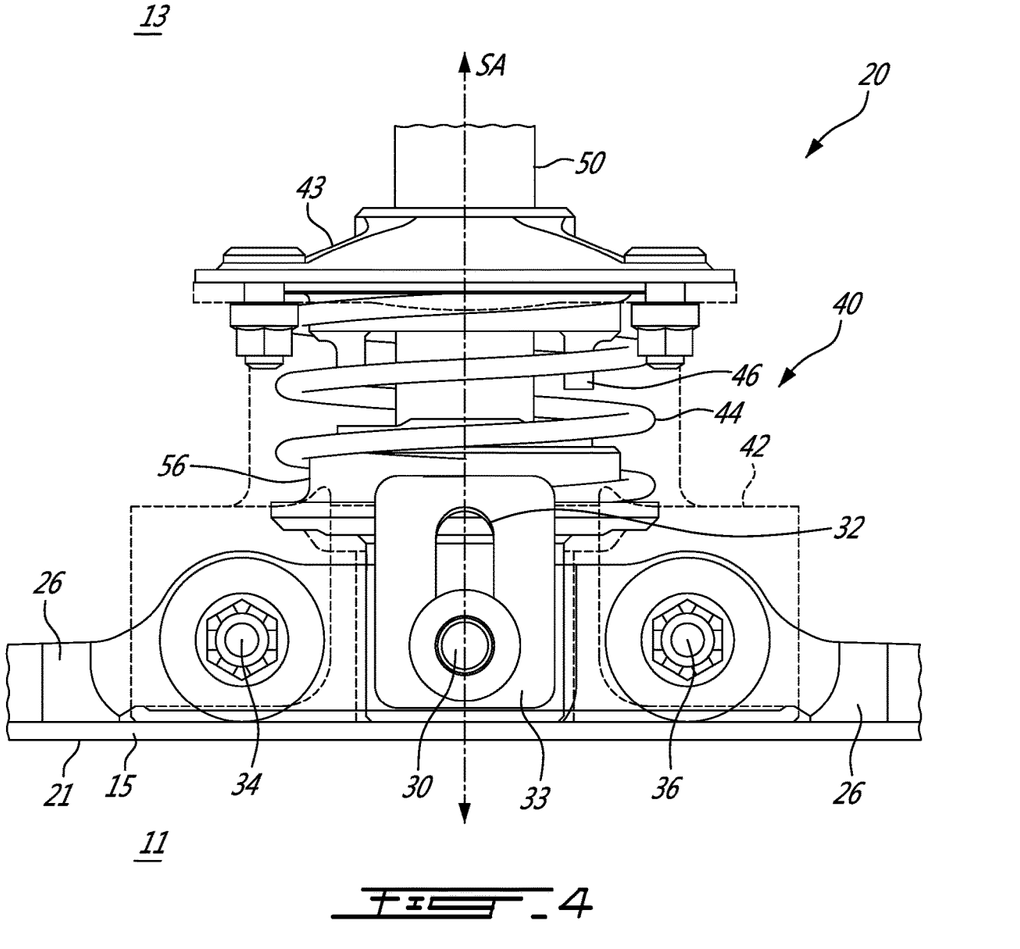
FIG. 4 is a top view of the handle assembly of FIG. 2.

Handle assembly 20 includes butterfly handle 22 accessible from exterior side 11. As shown in FIG. 4, butterfly handle 22 is rotatably connected to a driving member 46 of clutch 40, for example, by way of clutch housing 42, to engage with a shaft 50 that is associated with one or more functions to facilitate opening and closing door 12, for example, to drive a mechanism to latch and unlatch door 12, and/or lock and unlock door 12 or other suitable door mechanisms. Butterfly handle 22 may be retained in recess 23 in a stowed position by a flap 60. In some embodiments, butterfly handle 22 may be spring-loaded to bias to a stowed position. In other embodiments, butterfly handle 22 may be spring-loaded to bias to a deployed position and retained by flap 60.

Flap 60 may include a hook mechanism that is spring loaded, and actuated by a pushbutton. The hook mechanism may physically engage with one or more portion of butterfly handle 22, for example, a first leg 24 as illustrated in FIG. 2, to restrain butterfly handle 22 in a stowed position. The pushbutton may be accessible at exterior side 11 and actuated by force applied by a user to remove the restraint of hook mechanism from butterfly handle 22.

Butterfly handle 22 includes two oppositely extending portions, namely a first leg 24 and a second leg 26. First leg 24 extends from a first end 25A to a second end 25B, opposite first end 25A. Second leg 26 extends from a first end 27A to a second end 27B, opposite first end 27A. Adjacent ends first end 25A of first leg 24 and first end 27A of second leg 26 are pivoted about a connection axis such as common axis CA on a common pivot 30 housed within a slot 32 disposed on opposing sides of clutch housing 42.

In some embodiments, common pivot 30 may comprise a pin or bolt, as shown for example, in FIG. 3. In other embodiments, common pivot 30 may be another suitable pivot.

Each of first leg 24 and second leg 26 are rotatable about common pivot 30 between a stowed position and a deployed position of butterfly handle 22.

Figure 6A:
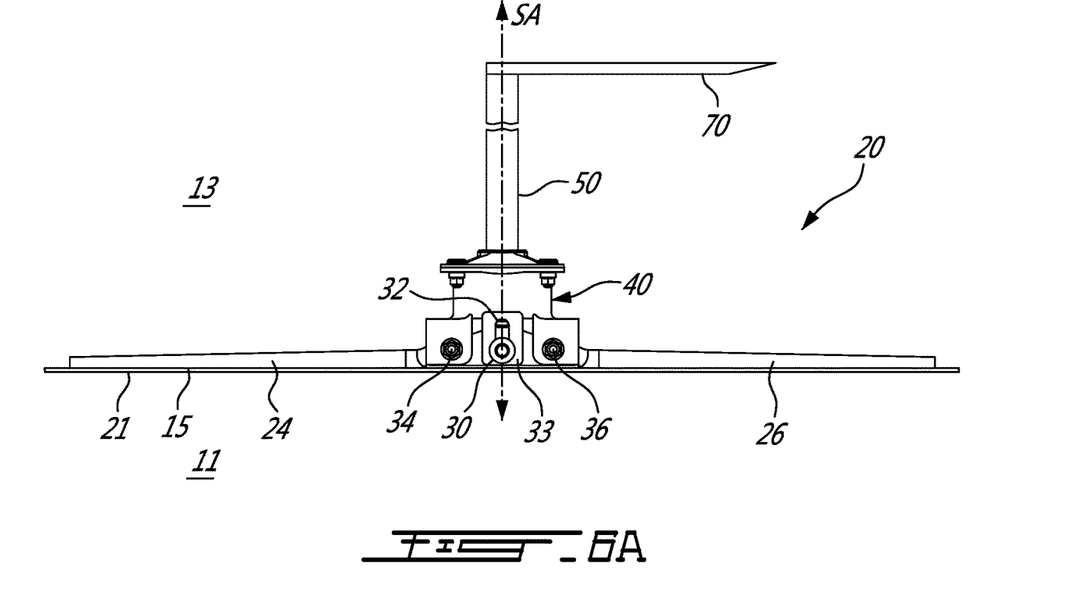
FIG. 6A is a top view of the handle assembly of FIG. 2 with the butterfly handle in a stowed position.

Butterfly handle 22 is shown in a stowed position, for example, in FIGS. 2 and 6A, in which butterfly handle 22 is disposed within recess 23. In some embodiments, in a stowed position, butterfly handle 22 is flush with external surface 21 of door 12.

Figure 6B:
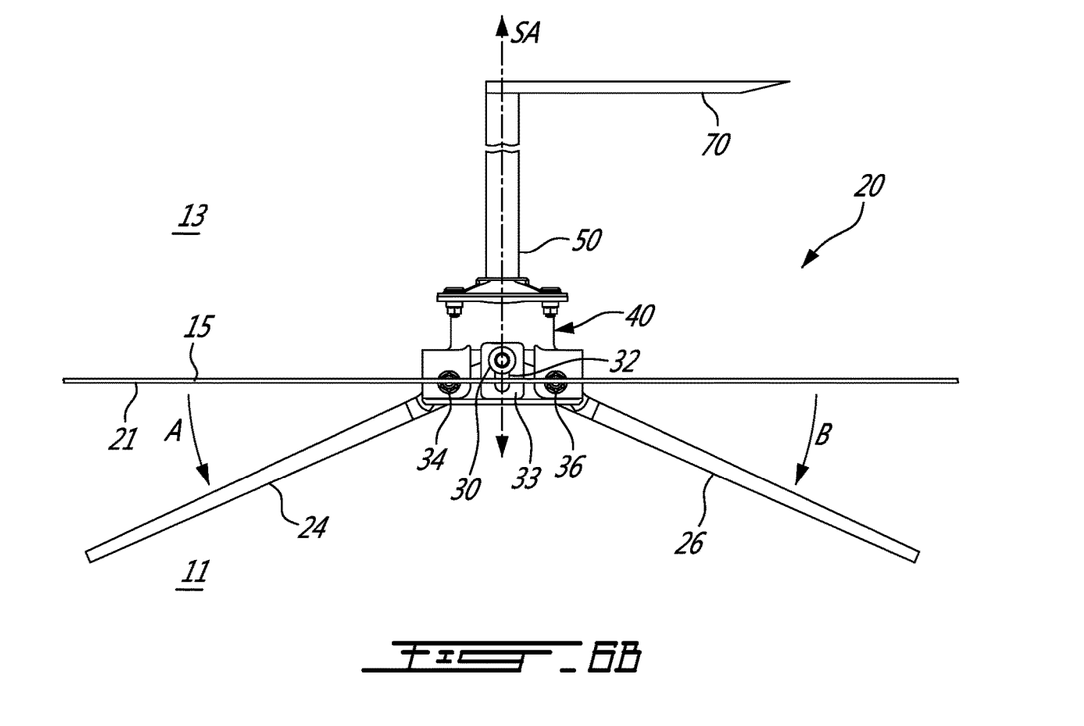
FIG. 6B is a top view of the handle assembly of FIG. 2 with the butterfly handle in a deployed position.

FIG. 6B illustrates butterfly handle 22 in a deployed or unstowed position. In a deployed position, butterfly handle 22 is accessible from exterior side 11, for example, to open door 12. In some embodiments, butterfly handle 22 may be spring-loaded to bias toward a deployed position and retained in a stowed position by flap 60.

Each of first leg 24 and second leg 26 are rotatably connected to clutch housing 42 at a first connecting pivot 34 and a second connecting pivot 36, respectively. First connecting pivot 34 and second connecting pivot 36 may be formed, for example, from a nut and bolt, or other suitable fastener to provide a rotatable connection between butterfly handle 22 and clutch housing 42.

Clutch 40 includes a driving member 46 and a driven member 52. Driving member 46 is axially movable along shaft axis SA between a disengaged configuration of clutch 40, in which driving member 46 and driven member 52 are rotatably disengaged as illustrated in an example in FIGS. 7A, 7B, and an engaged configuration of clutch 40, in which the driving member 46 and the driven member 52 are rotatably engaged as illustrated in an example in FIGS. 8A, 8B.

In a disengaged configuration of clutch 40, in which driving member 46 and driven member 52 are rotatably disengaged, butterfly handle 22 is rotatably and drivingly uncoupled from shaft 50 about shaft axis SA.

In an engaged configuration of clutch 40, in which the driving member 46 and the driven member 52 are rotatably engaged, butterfly handle 22 is rotatably and drivingly coupled to shaft 50 about shaft axis SA, by way of the connection of butterfly handle 22 to clutch housing 42, such that rotation of butterfly handle 22 about shaft axis SA drives rotation of shaft 50.

As will be appreciated, in an engaged configuration of clutch 40, driving member 46 may drive driven member 52, and driven member 52 may drive driving member 46.

Driving member 46 may be disposed within clutch housing 42 which may also house spring 44.

Figure 5:
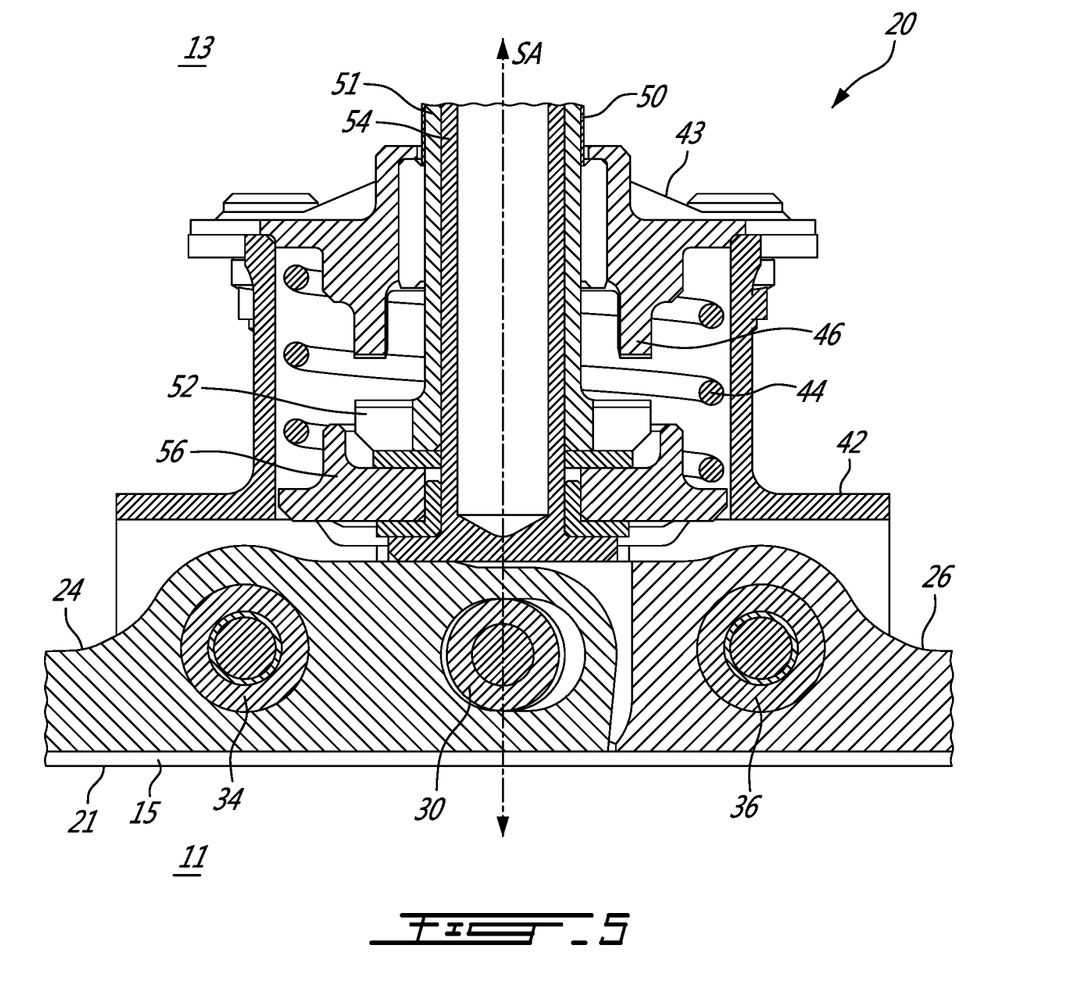
FIG. 5 is a cross-sectional view of the handle assembly of FIG. 2 along lines 5-5.

As shown, for example, in FIG. 5, driving member 46 may have a plurality of first teeth drivingly coupled to clutch housing 42 and butterfly handle 22, and driving member 46 is configured to engage with driven member 52, which has a plurality of second teeth or slots for receiving the first teeth, drivingly coupled to shaft 50.

In some embodiments, clutch 40 may be configured in an engaged configuration when butterfly handle 22 is deployed. In some embodiments, clutch housing 42 may be flush with external surface 21 when butterfly handle 22 is stowed and clutch 40 is in a disengaged configuration, as described in further detail below.

Clutch housing 42 may define slot 32, within which common pivot 30 extends, providing a channel for movement of common pivot 30 in a direction axial to shaft axis SA. In some embodiments, slot 32 may be reinforced by a bracket 33, as shown in FIG. 3. Bracket 33 may function as a washer to provide a sliding surface for common pivot 30 to move axially along shaft axis SA.

A cover 43 may be affixed to clutch housing 42, for example, with bolts as shown in FIG. 3. Cover 43 defines an aperture through which shaft 50 may extend.

In some embodiments, driving member 46 may be integrally formed with cover 43, as illustrated, for example, in FIG. 5. In some embodiments, driving member 46 may include two axially protruding teeth along shaft axis SA to mesh or mate with teeth (or slots) of driven member 52.

Spring 44 may be disposed within clutch housing 42 and bias driving member 46 in a direction along shaft axis SA to a disengaged configuration of clutch 40. In some embodiments, spring 44 may be a coil spring or other suitable spring member.

Shaft 50 extends along a shaft axis SA and may engage with one or more mechanisms (not shown) for facilitating opening and optionally closing of door 12. Shaft 50 includes an outer shaft 51 that extends along shaft axis SA affixed to an inner shaft 54 that similarly extends along shaft axis SA. Shaft 50 extends along shaft axis SA into clutch housing 42 through an opening in cover 43, and terminates at an end at which driven member 52 extends from outer shaft 51. In some embodiments, shaft 50, outer shaft 51, driven member 52 and inner shaft 54 are permanently fixed together, and may be integrally formed. In some embodiments, clutch housing 42 and cover 43 are permanently fixed together, and may be integrally formed.

Shaft 50 may be affixed within aircraft 10 or may be axially supported along shaft axis SA to restrain axial movement of shaft 50 by a suitable support, such as a shoulder.

As shown in FIG. 5, shaft 50 terminates at a hub 56. Hub 56 is axially retained between a flared lip at an end of inner shaft 54, and a flared lip (for example, part of driven member 52) at an end of outer shaft 51. Common pivot 30 extends along common axis CA through a base of hub 56 to drivingly couple common pivot 30 to hub 56 upon rotation about shaft axis SA. Shaft 50 is rotatable relative to hub 56 in a disengaged configuration of clutch 40. In an engaged configuration of clutch 40, since butterfly handle 22 is rotatably and drivingly coupled to drive rotation of shaft 50 about shaft axis SA, rotation of butterfly handle 22 about shaft axis SA drives rotation of common pivot 30 and hub 56 about shaft axis SA. Thus, in an engaged configuration of clutch 40, hub 56 rotates with shaft 50. Hub 56 may be shaped having an outer diameter greater than the diameter of outer shaft 51, and in operation may align driving member 46 as it engages with driven member 52.

Outer shaft 51 may terminate in clutch housing 42 with driven member 52. In some embodiments, driven member 52 may include two axially protruding teeth along shaft axis SA to engage with teeth of driving member 46 to drive shaft 50.

Teeth of driven member 52 may be rotationally offset about shaft axis SA from teeth of driving member 46 so as to mesh when brought into engagement.

In some embodiments, driven member 52 may include any number of protrusions corresponding to the number of teeth protruding from driving member 46 such that the teeth are engageable.

In some embodiments, clutch 40 may include other suitable clutch mechanisms such as a friction clutch in which driving member 46 includes a first surface and driven member 52 includes a second surface, and the surfaces engage upon a friction force between the first surface and the second surface. In some embodiments clutch 40 may include clutch mechanisms such as driving member 46 including a plate having apertures that engage with pins of driven member 52. As will be appreciated, the structure and mechanism of driving member 46 and driven member 52 may be reversed, in some embodiments.

Inner shaft 54 may be affixed to outer part of shaft 50, and have a smaller outer diameter than the inner diameter of outer shaft 51.

Shaft 50 may be connected to an interior handle 70, shown schematically in an example in FIGS. 6A and 6B, to allow door 12 to be opened and closed from interior side 13. As such, the interior handle may selectively drive shaft 50.

Figure 7A:
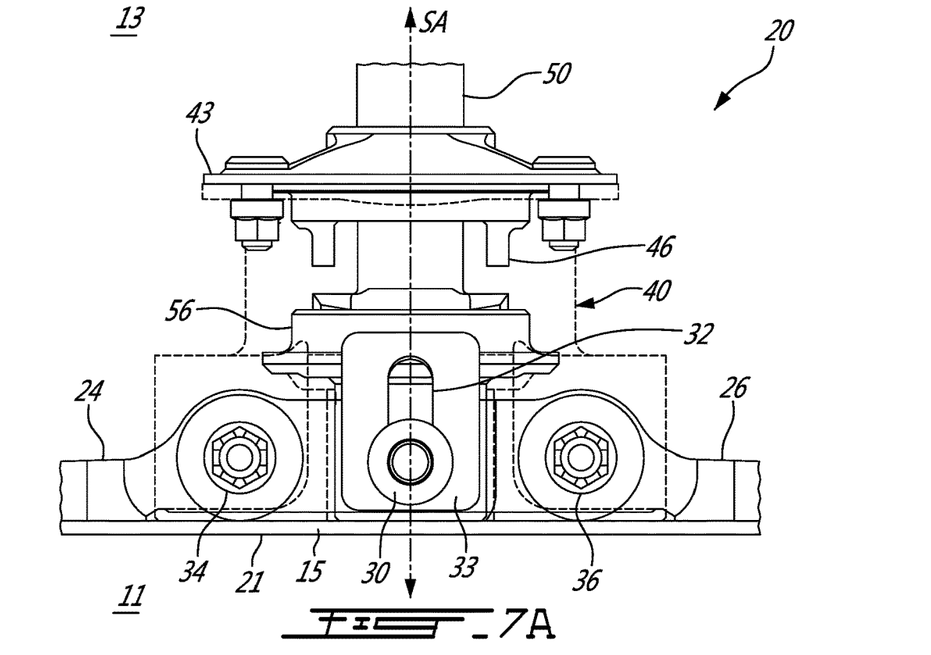
FIG. 7A is a partial top view of the handle assembly of FIG. 2 with the butterfly handle in a stowed position and a clutch in a disengaged configuration.
Figure 7B:
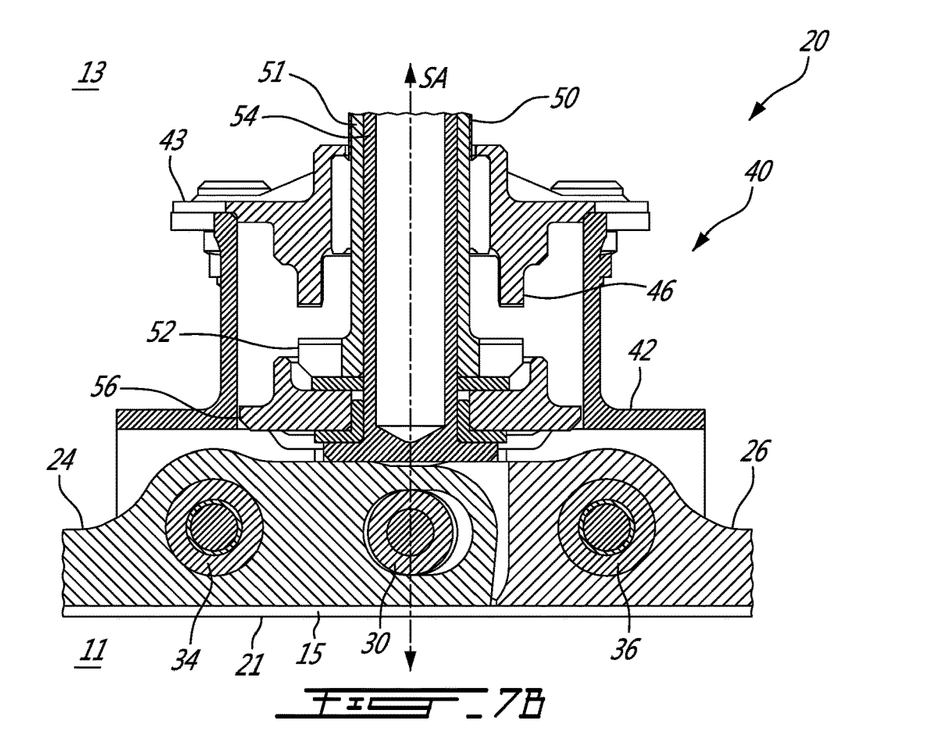
FIG. 7B is a partial cross-sectional view of the handle assembly of FIG. 2 along lines 5-5 with the butterfly handle in a stowed position and the clutch in a disengaged configuration.

FIG. 7A is a partial top view of handle assembly 20 with butterfly handle 22 in a stowed position and illustrated with spring 44 omitted, for clarity. FIG. 7B is a partial cross-sectional view of handle assembly 20 along lines 5-5 with butterfly handle 22 in a stowed position.

With butterfly handle 22 stowed, clutch 40 is disengaged, and shaft 50 can turn independently of butterfly handle 22.

In use, actuation of flap 60 may release butterfly handle 22 and allow first leg 24 and second leg 26 of butterfly handle 22 to be rotated in direction A and direction B (shown in FIG. 6A) about common axis CA, respectively, to a deployed position. First leg 24 and second leg 26 may rotate together, as they are linked together by common pivot 30.

Figure 8A:
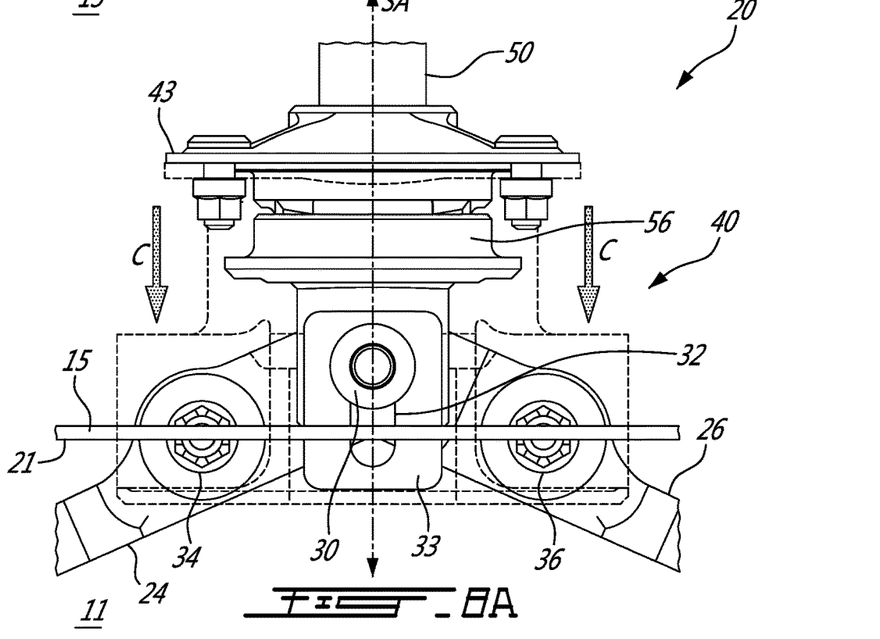
FIG. 8A is a partial top view of the handle assembly of FIG. 2 with the butterfly handle in a deployed position and the clutch in an engaged configuration.
Figure 8B:
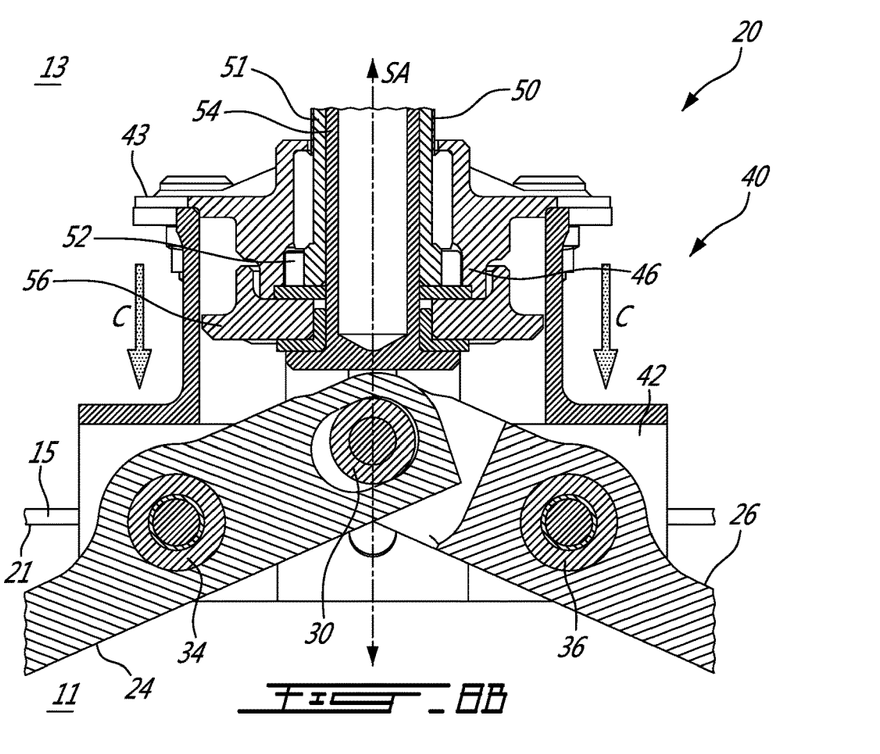
FIG. 8B is a partial cross-sectional view of the handle assembly of FIG. 2 along lines 5-5 with the butterfly handle in a deployed position and the clutch in an engaged configuration.

FIG. 8A is a partial top view of handle assembly 20 with butterfly handle 22 in a deployed position. FIG. 8B is a partial cross-sectional view of handle assembly 20 along lines 5-5 with butterfly handle 22 in a deployed position.

Upon rotation of each of first leg 24 and second leg 26 of butterfly handle 22 in direction A and direction B about common axis CA, respectively, connection pivot 34 and connection pivot 36 translate said rotation into axial movement of driving member 46 by way of clutch housing 42, in an axial direction C along shaft axis SA towards exterior side 11.

Driving member 46 and clutch housing 42 move in axial direction C with slot 32 avoiding obstruction by common pivot 30. Driving member 46 then engages with driven member 52, for example, by way of teeth of driving member 46 moving axially along shaft axis SA to mesh with teeth of driven member 52.

Rotation of butterfly handle 22 about shaft axis SA may then drive rotation of clutch 40 about shaft axis SA and shaft 50 about shaft axis SA.

Figure 9A:
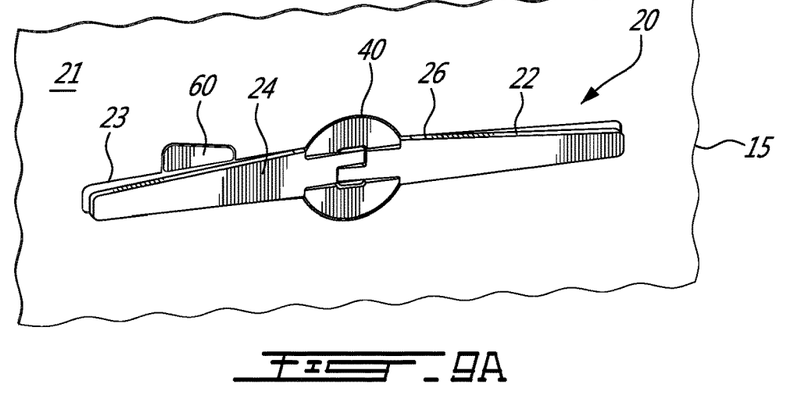
FIG. 9A is a front perspective view of the handle assembly of FIG. 2 with the butterfly handle in a deployed position.
Figure 9B:
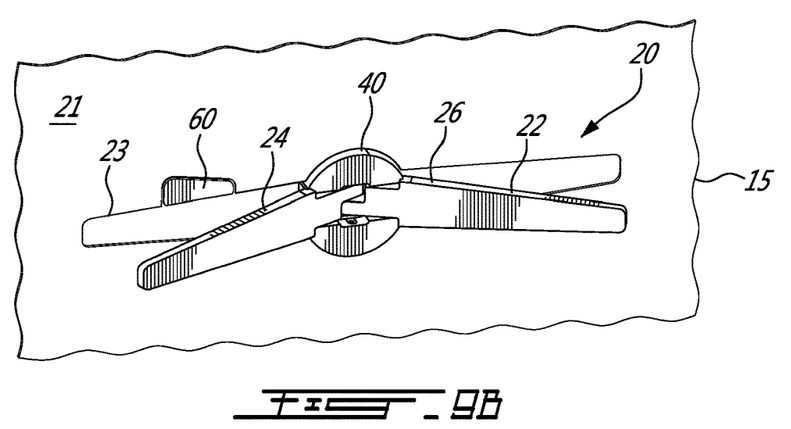
FIG. 9B is a front perspective view of the handle assembly of FIG. 2 with the butterfly handle in a further rotated deployed position.
Figure 9C:
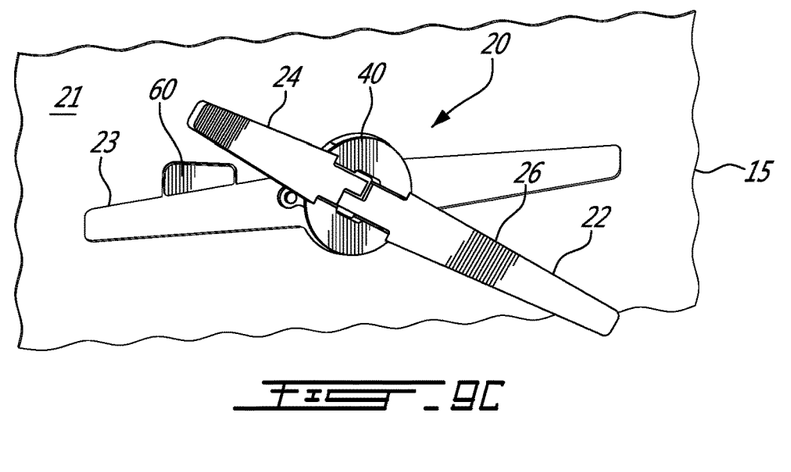
FIG. 9C is a front perspective view of the handle assembly of FIG. 2 with the butterfly handle in a rotated position.

FIGS. 9A to 9C illustrate use of handle assembly 20 to unstow and deploy butterfly handle 22, engage clutch 40, and rotate butterfly handle 22 about shaft axis SA, thus driving rotation of shaft 50 by butterfly handle 22.

FIG. 9A is a front perspective view of handle assembly 20 with butterfly handle 22 in a deployed position and first leg 24 and second leg 26 rotated about common axis CA. FIG. 9B is a front perspective view of handle assembly 20 with butterfly handle 22 in a further rotated deployed position and first leg 24 and second leg 26 further rotated about common axis CA. FIG. 9C is a front perspective view of the handle assembly of FIG. 2 with butterfly handle 22 rotated about shaft axis SA.

As butterfly handle 22 is rotated about shaft axis SA, butterfly handle 22 drives rotation of clutch housing 42, which in turn drives rotation of driving member 46 and driven member 52, as driving member 46 is engaged with driven member 52, and thus in turn drives rotation of shaft 50.

First leg 24 and second leg 26 may be rotated about shaft axis SA by a user using a hand on each respective leg, which may provide an ergonomic grip configuration.

Figure 10:
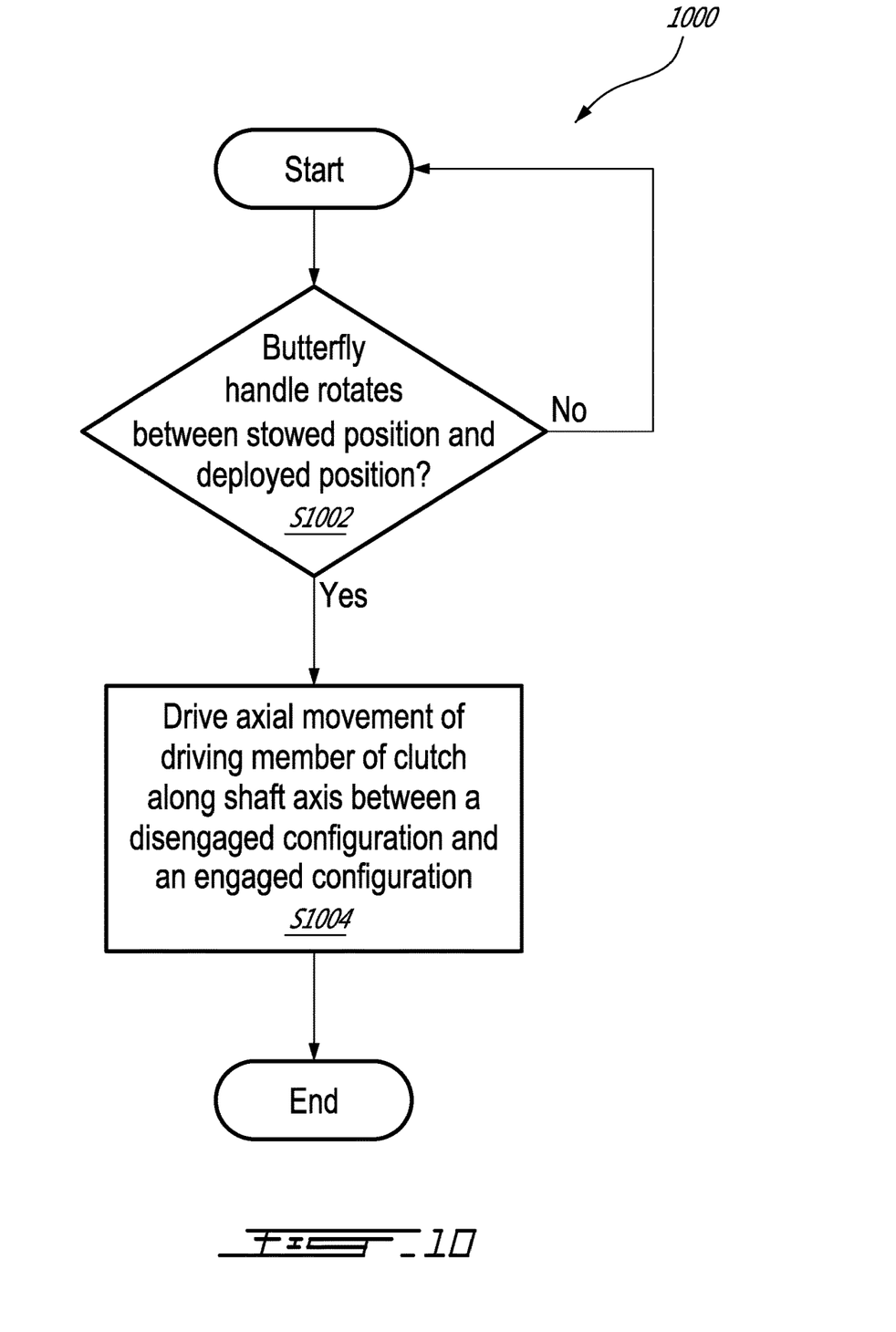
FIG. 10 is a flowchart of a method for operating a door handle assembly, according to an embodiment.

FIG. 10 is a flowchart of a method 1000 for operating handle assembly 20 of door 12. Method 1000 may be used for engaging butterfly handle 22 with shaft 50 to drive opening and closing door 12.

At block S1002, if first leg 24 and second leg 26 of butterfly handle 22 rotate between a stowed position and a deployed position, for example, about common axis CA, control flow proceeds to block S1004. Otherwise, control flow returns to block S1002.

At block S1004, axial movement drives driving member 46 of clutch 40 along shaft axis SA between a disengaged configuration in which butterfly handle 22 is rotatably uncoupled from shaft 50 and an engaged configuration in which butterfly handle 22 is rotatably coupled to shaft 50.

In some embodiments, butterfly handle 22 is rotatable about shaft axis SA to drive rotation of shaft 50 about shaft axis SA when clutch 40 is in the engaged configuration.

Conveniently, door assembly 20 may thus provide a reduced clutch complexity and adjustment with a simple clutch design and a reduced space allocation for a more compact design to engage butterfly handle 22 with shaft 50 to drive mechanics of door 12 such as opening and closing of door 12.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:
1. A handle assembly for an aircraft door, the aircraft door including an exterior side and an interior side, the handle assembly comprising:
    a shaft rotatable about a shaft axis to facilitate opening of the aircraft door;
    an exterior handle accessible from the exterior side of the aircraft door and deployable between a stowed posi- tion, in which the exterior handle is recessed within an opening on the exterior side of the aircraft door, and a deployed position;

a clutch having a driving member drivingly coupled to the exterior handle and a driven member drivingly coupled to the shaft, the clutch configurable between a disengaged configuration in which the driving member and the driven member are disengaged and the exterior handle is drivingly uncoupled from the shaft, and an engaged configuration in which the driving member and the driven member are engaged and the exterior handle is drivingly coupled to the shaft via the driving member and the driven member so that actuation of the exterior handle causes a rotation of the shaft to facilitate opening of the door, and a coil spring coaxial with the shaft axis to bias the clutch toward the disengaged configuration;

wherein rotation of the exterior handle between the stowed position and the deployed position drives an axial movement of the driving member along the shaft axis toward the driven member to configure the clutch to the engaged configuration; and wherein the driving member is disposed within a housing that is movable along the shaft axis.

2. The handle assembly of claim 1, wherein the exterior handle is rotatable to deploy from the stowed position to the deployed position.

3. The handle assembly of claim 1, wherein the actuation of the exterior handle comprises rotation of the exterior handle about the shaft axis.

4. The handle assembly of claim 1, wherein the shaft extends axially through the coil spring.

5. The handle assembly of claim 1, wherein the exterior handle is drivingly coupled to the driving member by way of the housing.

6. The handle assembly of claim 1, wherein, in the engaged configuration, the housing rotates about the shaft axis as the exterior handle rotates about the shaft axis.

7. The handle assembly of claim 1, wherein the driving member comprises a plurality of first teeth configured to be received in an interior space defined by a plurality of second teeth of the driven member in the engaged configuration of the clutch.

8. The handle assembly of claim 1, wherein the driving member comprises a first surface configured to frictionally engage with a second surface of the driven member in the engaged configuration of the clutch.

9. The handle assembly of claim 1, wherein the exterior handle is rotatable about a connection axis that is generally orthogonal to the shaft axis.

10. The handle assembly of claim 9, wherein the exterior handle comprises two oppositely extending portions having their adjacent ends pivoted on a common pivot rotatable about the connection axis and the exterior handle is rotatably connected to the driving member.

11. The handle assembly of claim 10, wherein the common pivot is restrained from axial movement along the shaft axis.

12. The handle assembly of claim 1, further comprising an interior handle drivingly coupled to the shaft and accessible from the interior side of the aircraft door.

13. An aircraft door comprising the handle assembly as defined in claim 1.

14. An aircraft comprising the aircraft door of claim 13.

15. A method for operating an aircraft door, the aircraft door having an interior side, an exterior side, an exterior handle accessible from the exterior side, and a shaft rotatable about a shaft axis to facilitate opening of the aircraft door, the method comprising:

when the exterior handle deploys between a stowed position, in which the exterior handle is recessed within an opening on the exterior side of the aircraft door, and a deployed position, driving axial movement of a driving member of a clutch that is drivingly coupled to the exterior handle along the shaft axis toward a driven member of the clutch that is drivingly coupled to the shaft, wherein the axial movement of the driving member configures the clutch from a disengaged configuration in which the driving member and the driven member are disengaged and the exterior handle is drivingly uncoupled from the shaft, to an engaged configuration in which the driving member and the driven member are engaged and the exterior handle is drivingly coupled to the shaft via the driving member and the driven member so that actuation of the exterior handle causes a rotation of the shaft to facilitate opening of the aircraft door;

wherein the aircraft door comprises a coil spring coaxial with the shaft axis to bias the clutch toward the disengaged configuration; and wherein the driving member is disposed within a housing that is movable along the shaft axis.

16. The method of claim 15, wherein when the exterior handle deploys, the exterior handle rotates from the stowed position to the deployed position.

17. The method of claim 16, wherein the exterior handle rotates from the stowed position to the deployed position about a connection axis that is generally orthogonal to the shaft axis.

18. The method of claim 17, wherein the exterior handle comprises two oppositely extending portions having their adjacent ends pivoted on a common pivot and when the exterior handle deploys, each portion rotates from the stowed position to the deployed position about the connection axis.

19. The method of claim 15, wherein the actuation of the exterior handle comprises rotation of the exterior handle about the shaft axis.

* * * * *